United States Patent
Li et al.

(10) Patent No.: US 8,805,845 B1
(45) Date of Patent: Aug. 12, 2014

(54) FRAMEWORK FOR LARGE-SCALE MULTI-LABEL CLASSIFICATION

(71) Applicant: LinkedIn Corporation, Mountain View, CA (US)

(72) Inventors: Liyun Li, San Jose, CA (US); Hyun Chul Lee, Mountain View, CA (US); Shuai Li, Mountain View, CA (US)

(73) Assignee: LinedIn Corporation, Mountain View, CA (US)

( * ) Notice: Subject to any disclaimer, the term of this patent is extended or adjusted under 35 U.S.C. 154(b) by 0 days.

(21) Appl. No.: 13/956,070

(22) Filed: Jul. 31, 2013

(51) Int. Cl.
G06F 7/00 (2006.01)
G06F 17/30 (2006.01)

(52) U.S. Cl.
USPC .......................... 707/738; 707/758; 707/798

(58) Field of Classification Search
USPC ......................................... 707/737, 748, 798
See application file for complete search history.

(56) References Cited

U.S. PATENT DOCUMENTS 5,966,686 A * 10/1999 Heidorn et al. .................... 704/9
7,853,622 B1 * 12/2010 Baluja et al. ................... 707/803

OTHER PUBLICATIONS

Klinger et al., Classifical Probabilistic Models and Conditional Random Fields Dec. 7, Dortmund University of Technology, version 1, 31 pages + coversheet.*
Moonesinghe et al., A Probabilistic Substructure-Based Approach for Graph Classification [Date unknown, but was archived in archive.org as of Nov. 17, 2009], msu.edu, 8 pages.*
Flake et al., Graph Clustering and Minimum Cut Trees Apr. 1, 2004, Internet Mathematics vol. 1, pp. 385-408.*
van Dongen, Performance criteria for graph clustering and Markov cluster experiments May 31, 2000, Centrum voor Wiskunde en Informatica, 36 pages + cover.*
Dhillon et al., Weighted Graph Cuts without Eigenvectors: A Multilevel approach Feb. 14, 2007 [note: See p. 1 footnote regarding online publication date earlier than journal publication date], IEEE Computer Society, IEEE Transactions on Pattern Analysis and Machine Intelligence vol. 29 No. 11, pp. 1-14.*
Scovanner, An Introduction to Graph-Cut "spring" 2006 [Accessed on Nov. 4, 2013], ucf.edu, http://www.cs.ucf.edu/courses/cap6411/cap6411/spring2006/Lecture11.pdf.*
Saha, Dynamic Algorithm for Graph Clustering Using Minimum Cut Tree 2006-2007 [See p. 1 footnote regarding earlier version of paper], SIAM, http://www.siam.org/proceedings/datamining/2007/dm07_065Saha.pdf.*
Barutcuoglu, Zafer, et al., "Hierarchical Multi-Label Prediction of Gene Function", Bioinformatics, vol. 22, No. 7, (2006), 830-836.
Blum, Avrim, et al., "Learning from Labeled and Unlabeled Data using Graph Mincuts", Proceedings of the Eighteenth International Conference on Machine Learning, (2001), 19-26.

(Continued)

*Primary Examiner* — Jason Liao
(74) *Attorney, Agent, or Firm* — Schwegman, Lundberg & Woessner, P.A.

(57) ABSTRACT

A framework for large-scale multi-label classification of an electronic document is described. An example multi-label classification system is configured to first apply weak classifiers and identify seed labels, then determine additional labels based on the seed labels and label correlation data derived from member profiles maintained by an on-line social network system. The multi-label classification system then constructs an s-t graph comprising nodes that correspond to the seed labels and the additional labels. A clustering algorithm is then applied to the constructed graph to arrive to a labels graph. The labels graph is deemed to include nodes that correspond to topics discussed or referenced in the electronic document.

19 Claims, 7 Drawing Sheets (56) References Cited

OTHER PUBLICATIONS

Boutell, Matthew R, et al., "Learning multi-label scene classifcation", Pattern Recognition, 37, (2004), 1757-1771.

Boykov, Y., "Graph Cuts in Vision and Graphics: Theories and Applications", Handbook of Mathematical Models in Computer Vision, Springer, (2006), 19 pgs.

Bucak, S. S, et al., "Efficient multi-label ranking for multi-class learning: Application to object recognition", 2009 IEEE 12th International Conference on Computer Vision, (2009), 2098-2105.

Bucak, S. S, et al., "Multi-label learning with incomplete class assignments", 2011 IEEE Conference on Computer Vision and Pattern Recognition (CVPR), (2011), 2801-2808.

De Comite, Francesco, et al., "Learning Multi-label Alternating Decision Trees from Texts and Data", Machine Learning and Data Mining in Pattern Recognition Lecture Notes in Computer Science, vol. 2734, (2003), 35-49.

Dembczynski, K., et al., "Bayes Optimal Multilabel Classification via Probabilistic Classifier Chains", Proceedings of the 27th International Conference on Machine Learning., (2010), 279-286.

Dembczynski, K., et al., "On Label Dependence and Loss Minimization in Multi-Label Classification", Machine Learning, 88 (1-2), (2012), 5-45.

Dhillon, Inderjet, et al., "Weighted Graph Cuts without Eigenvectors: A Multilevel Approach", IEEE Transactions on Pattern Analysis and Machine Intelligence, vol. 29, No. 11, (Nov. 2007), 1944-1957.

Elisseeff, a., et al., "A Kernel Method for Multi-labelled Classification", NIPS, (2001), 681-687.

Furnkranz, J., et al., "Multilabel Classification via Calibrated Label Ranking", MachineLearning,73(2), (2008), 133-153.

Ghamrawi, N., et al., "Collective multi-label classification", CIKM '05 Proceedings of the 14th ACM International Conference on Information and Knowledge Management, (2005), 195-200.

Guo, Y., et al., "Adaptive Large Margin Training for Multilabel Classification", AAAI, (2011), 6 pgs.

Guo, Y., et al., "Semi-supervised Multi-label Classification: A Simultaneous Large-Margin, Subspace Learning Approach", Machine Learning and Knowledge Discovery in Databases Lecture Notes in Computer Science, vol. 7524, (2012), 355-370.

Hariharan, Bharath, et al., "Efficient max-margin multi-label classification with applications to zero-shot learning", Machine Learning, 88(1-2), (Jul. 2012), 127-155.

Hariharan, Bharath, et al., "Large Scale Max-Margin Multi-Label Classification with Priors", ICML, (2010), 423-430.

He, J., et al., "Graph-based semi-supervised learning as a generative model", IJCAI'07 Proceedings of the 20th international joint conference on Artifical intelligence, (2007), 2492-2497.

Hsu, D., et al., "Multi-Label Prediction via Compressed Sensing", NIPS 2009, (2009), 772-780.

Huang, Sheng-Jun, "Multi-Label Learning by Exploiting Label Correlations Locally", AAAI, (2012), 7 pgs.

Ji, S., et al., "Extracting shared subspace for multi-label classification", KDD '08 Proceedings of the 14th ACM SIGKDD international conference on Knowledge discovery and data mining, (2008), 381-389.

Jin, Bo, et al., "Multi-Label Literature Classification based on the Gene Ontology Graph", BMC Bioinformatics, 9, (2008), 15 pgs.

Kazawa, Hideto, et al., "Maximal Margin Labeling for Multi-Topic Text Categorization", NIPS, (2004), 8 pgs.

Kleinberg, Jon, et al., "Approximation Algorithms for Classification Problems with Pairwise Relationships: Metric Labeling and Markov Random Fields", Journal of the ACM, vol. 49, No. 5, (Sep. 2002), 616-639.

McCallum, Andrew, "Multi-Label Text Classification with a Mixture Model Trained by EM", AAAI '99 Workshop on Text Learning, (1999), 7 pgs.

Nigam, K., "Using maximum entropy for text classification", IJCAI-99 Workshop on Machine Learning for Information Filtering, (1999), 61-67.

Pang, B., et al., "A Sentimental Education: Sentiment Analysis Using Subjectivity Summarization Based on Minimum Cuts", ACL, (2004), 271-278.

Petterson, J., et al., "Submodular Multi-Label Learning", NIPS, (2011), 1512-1520.

Qi, G. J, et al., "Correlative multi-label video annotation", Multimedia '07 Proceedings of the 15th international conference on Multimedia, (2007), 17-26.

Read, Jesse, et al., "Classifier Chains for Multi-label Classification", Machine Learning, 85(3), (May 2011), 333-359.

Read, Jesse, "Scalable Multi-label Classification", PhD Thesis, University of Waikato, Hamilton, New Zealand, (Sep. 2010), 200 pgs.

Roth, Volker, et al., "Improved Functional Prediction of Proteins by Learning Kernel Combinations in Multilabel Settings", BMC Bioinformatics,8 (S-2), (2007), 12 pgs.

Rousu, J., et al., "Learning hierarchical multi-category text classification models", ICML '05 Proceedings of the 22nd international conference on Machine learning, (2005), 744-751.

Schapire, R, et al., "BoosTexter: A Boosting-based System for Text Categorization", Machine Learning, 39,, (2000), 135-168.

Sun, L., et al., "Hypergraph spectral learning for multi-label classification", KDD '08 Proceedings of the 14th ACM SIGKDD international conference on Knowledge discovery and data mining, (2008), 668-676.

Tsoumakas, G., et al., "Introduction to the special issue on learning from multi-label data", Mach Learn, 88(1-2), (2012), 1-4.

Tsoumakas, Grigorios, et al., "Mining Multi-label Data", Data Mining and Knowledge Discovery Handbook, (2010), 667-685.

Ueda, Naonori, "Parametric mixture models for multi-labeled text", NIPS, (2002), 721-728.

Ueda, Naonori, et al., "Single-shot detection of multiple categories of text using parametric mixture models", KDD '02 Proceedings of the Eighth ACM SIGKDD International Conference on Knowledge Discovery and Data Mining, (2002), 626-631.

Van Dongen, S., "Graph Clustering by Flow Simulation", PhD Thesis, University of Ultrecht, (May 2000), 175 pgs.

Yan, Rong, et al., "Model-shared subspace boosting for multi-label classification", KDD '07 Proceedings of the 13th ACM SIGKDD International Conference on Knowledge Discovery and Data Mining, (2007), 834-843.

Yang, Bishan, et al., "Effective Multi-Label Active Learning for Text Classification", KDD '09, (2009), 917-926.

Zhang, Jian, et al., "Learning Multiple Related Tasks using Latent Independent Component Analysis", NIPS, (2005), 8 pgs.

Zhang, Min-Ling, et al., "Multi-label learning by exploiting label dependency", KDD '10 Proceedings of the 16th ACM SIGKDD International Conference on Knowledge Discovery and Data Mining, (2010), 999-1008.

Zhu, S., et al., "Multi-labelled classification using maximum entropy method", SIGIR '05 Proceedings of the 28th Annual International ACM SIGIR Conference on Research and Development in Information Retrieval, (2005), 274-281.

\* cited by examiner

FRAMEWORK FOR LARGE-SCALE MULTI-LABEL CLASSIFICATION

TECHNICAL FIELD

This application relates to the technical fields of software and/or hardware technology and, in one example embodiment, to a framework for large-scale multi-label classification.

BACKGROUND

Multi-label classification problem, which aims to assign multiple class labels to a given object, has recently attracted much attention. A single-label scenario, where each given object is associated with just one label, is rarely suitable for real applications, since real-world objects are usually associated with multiple labels. In text categorization, for instance, each document may belong to several topics or tags. For the purposes of this description, the terms document and electronic document may be used interchangeably. The main challenge associated with many real-world multi-label classification problems is to find the optimal mapping from the space of features to the space of label sets, which is particularly difficult since the potential set of labels that might be assigned to a given object is quite large (exponential to the total number of labels). There have been attempts to deal with this intrinsic complexity of finding the optimal mapping. These attempts, however, typically assume that the label space is relatively small and that at least some training data is available for each label.

One way of dealing with a multi-label classification problem is by treating it as a setting with independent binary classification instances, one for each possible label. This type of approach may be called a first-order approach. One potential problem with the first-order approaches is that their performance is usually non-satisfactory, as they operate on an assumption that the labels are independent of each other. Another limitation of the first-order approaches is that, as the number of labels increases, obtaining any significant amount of training data becomes increasingly expensive, making these first-order approaches non-scalable. Other approaches include second- and third-order approaches, which utilize correlations between different labels. Second-order approaches leverage pair-wise label relations. Third-order approaches leverage hierarchical or more complex label relations.

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

An example framework for large-scale multi-label classification is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate that member's connection to other members of the social network. A member profile may also include or be associated with comments or endorsements from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members who are connected in the context of a social network may be termed each other's connections.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include a list of professional skills possessed or advertised by the member. The words and phrases describing professional skills of a member, such as, e.g., "computer science" or "cloud computing," may be used as labels or tags for categorizing/classifying an electronic document.

In order to classify or categorize documents that may potentially be associated with topics from a vast topics dictionary, such as a dictionary of skills that may be listed in member profiles of an on-line professional networking system an example framework for large-scale multi-label classification may be utilized. A framework for large-scale multi-label classification may also be referred to as simply "framework," for the purposes of this description. In one embodiment, the entries in the dictionary of skills are used by the framework as labels or tags for categorizing electronic documents. An electronics document may be associated with multiple topics and thus may be assigned multiple labels by the framework. For example, the contents of an electronic document may be related to computer programming, cloud computing, and streaming video, and may be labeled by the framework with "computer programming," "cloud computing," and "streaming video" labels. The entries in the dictionary of skills—referred to as labels when utilized by the framework—may be assigned correlation values. A correlation value for a pair of labels may be calculated based on co-occurrence of the labels in the member profiles, as described further below.

In one embodiment, the framework first generates the graph representation of labels that are potentially related to the given document, and then produces the final set of labels associated with the document by using a clustering algorithm. For example, the framework may be built upon a semi-supervised graph learning algorithm, as it assumes the absence of sufficient training data while it assumes the availability of label correlation data. Given a set of documents to be classified or categorized, the first step is to employ different multi-class classifiers that are trained over the given training dataset to produce some initial labels for each document. The outcome of such classification results is combined and then expanded in a graph structure, where nodes weights represent classification results in the first step, while edge weights represent label correlations. In the final step, a binary cut is performed using a clustering algorithm, in which one of the produced binary cuts corresponds to labels that best represent the topics associated with the given document.

Thus, the framework may be described as consisting of three layers: (1) Weak-Classification, (2) Graph Construction & Expansion, and (3) Binary Cut. During the weak classification stage, standard classification techniques (termed the weak classifiers) are utilized to produce a set of label candidates that may be referred to as "seed labels." The classifiers from this layer, weak classifiers, may (or may not) be trained over a very limited training data. In some embodiments, an ensemble of different weak classifiers may be used that complement each other. The outcome of different classification results is combined in the graph construction and expansion layer. During graph construction and expansion, a graph structure is produced, in which the nodes in the graph correspond to the union of all labels (seed labels) produced by weak-classifiers from the previous layer. During this step, the set of seed labels is expanded by complementing them with additional labels through the exploitation of label correlations, as described in more detail further below. Additional labels are discovered for the purpose of increasing the overall recall of the multi-label classification task, as it is highly likely that during the initial weak classification stage not every label that is possibly related to the given document has been properly discovered.

Using the seed labels, together with the additional labels determined based on the correlation information, the framework constructs an expanded graph, where nodes corresponding to the seed labels are termed "seed nodes" and the nodes corresponding to additional nodes are termed "expanded nodes." The seed nodes are assigned respective weights that are calculated as a combination of classification scores or confidence scores. The edges between nodes in the expanded graph are assigned values of correlation scores associated with the respective labels.

During the binary cut step, the framework uses a clustering algorithm that can produce a binary cut that can best represent labels that are related to the given document. The accuracy of a particular clustering algorithm used for the binary cut may have an impact on the final precision of the multi-label classification task, as during the previous steps it is likely that precision was somewhat sacrificed for the sake of maximizing the recall. Example weak classifiers, example graph construction and expansion algorithms, and example clustering algorithms are described below.

Weak Classification

As mentioned above, one or more weak classifiers may be used to discover the initial set of seed labels. In one embodiment, two different types of weak classifiers are used by the framework. One of the weak classifiers is based on the entity extraction, and the other is based on traditional text classification techniques. The first weak classifier is a conditional random field based tagger (termed CRF-Tagger) that used the principles of named entity recognition. The named entity recognition (NER) task is a typical natural language processing task of extracting named entities from the contents of a document. The first layer of an example CRF-Tagger may be built using traditional conditional random field (CRF) of the second degree, using, e.g., CoNLL2003 dataset as training data or some other training data. CoNLL2003 dataset (a dataset provided at the Conference on Computational Natural Language Learning of 2003) supports four types of label entities, namely "Organization," "Person," "Location," and "Misc." The second layer of the CRF-Tagger is an additional layer that is designed to incorporate entries from a dictionary of skills of an on-line professional networking system into the dictionary set of the CRF-Tagger. The CRF-Tagger employs traditional SVM-based classification approach to determine whether an entry from the skills dictionary should be associated with the given document or not. SVM stands for "support vector machines," which are supervised learning models for data analysis and pattern recognition. All four types of label entities produced by the first layer of the CRF-Tagger are used as possible candidates for such classification.

The second weak-classifier that may be used by the framework is the maximum-entropy-based text classifier (MaxEnt Classifier). In one embodiment, the training data for the MaxEnt classifier is the set of wikipages for respective entries in the skills dictionary. Such wikipages may be provided by the on-line social networking system. I will be noted, that various off-the-shelf or modified weak classifiers together with ant limited training data may be used to determine the seed labels.

Graph Construction & Expansion

Using the result of weak classification, a graph structure is constructed. The set of nodes, V, in the graph structure G=(V, E), consists of the union of "seed" nodes (the nodes that represent the seed labels) and "expanded" nodes (the additional nodes discovered utilizing correlation data with respect to entries in the skills dictionary). Let w(i) denote the weight for node i, which represents the likelihood of node i (representing a certain topic or label) being relevant to the given document, according to the output of the weak classifiers. Let w(i) be the linear combination of weak classification scores if i∈Seeds, and let w(i) be a constant value, e.g., δ, if i∈Expanded. While the overall graph construction step may be fundamentally the same regardless of what clustering algorithm is being used, some specifics of it may vary depending on the clustering algorithm. Let "labels graph" refer to the constructed final graph.

Binary Cut

As mentioned above, a clustering algorithm is applied in order to generate the binary cut over the graph constructed in the previous step. The produced left cut may be treated as representing the set of labels that are associated with the given document. Some example clustering algorithms, such as MinCut algorithm, Markov clustering, and the normalized graph cut algorithm are described below.

MinCut algorithm is an algorithm for the metric labeling problem. While the metric labeling problem is NP-hard when the number of partitions is greater than two, the binary metric labeling problem has a polynomial algorithm, MinCut, which is based on the classical Max-Flow/Min-Cut notion. A problem is NP-hard if an algorithm for solving it can be translated into one for solving any NP-problem (nondeterministic polynomial time) problem. In metric labeling, there are the notions of "positive" and "negative" labels, which correspond the likelihood of nodes being parts of the left cut and the right cut respectively. Node and edge weights are constructed based on the following proposals. The first proposal is that the "seed" nodes have higher chance of being "positive" labels than "expanded" nodes and therefore only seed nodes are connected to the source node (which means that seed nodes are dominantly "positive" labels) with weights reflecting the outcome of weak classification. The second proposal is that every node in the graph has some chance of being a "negative" label and therefore it is connected to the sink node with some minimal weight, while expanded nodes have higher sink edge weights than seed nodes as these were not produced by weak classification.

Let $v_{src}$ denote the source node and $v_{snk}$ denote the sink node of the S-T graph resulting from the cut. The S-T graph is constructed from the original graph G=(V,E) as follows:

For every $v_i \in$ Seeds, add edge $e^i_{src}$ between $v_{src}$ and $v_i$, whose weight, w(i,j), is the linear combination of the weak classification scores for i.

For $v_i, v_j \in V$; i≠j, add edge $e^j_i$ between $v_j$ if there is an edge between $v_i, v_j$ in the original graph G, whose weight w(i,j) will be β·w(i,j) for some constant β.

For every vi∈V, add edge $e^i_{snk}$ between $v_{snk}$ and $v_i$, whose weight, w(i,snk), is given as: constant δ if vi∈Seeds and λΣw(i,j) otherwise.

MinCut algorithm is then applied to the constructed s-t graph to produce the final cut for the labels graph.

While the MinCut approach described above is discrete and deterministic in nature, a statistical approach may also be utilized to generate the binary cut. A statistical approach for producing the binary cut for the given labels graph may be a random-walk-based Markov Clustering (MCL). The idea behind the MCL's random walk is that, when the random walk is performed on a graph, there will be more links within the same cluster, while there will be fewer links between different clusters. In MCL, the random walks on the labels graph are computed using "Markov Chains." That is, the probability of walking into any specific node does not depend on the past probabilities, and therefore the trajectory of the current random walk is what matters. Any trajectory of the random walks is an example of a Markov chain expressed through the transition matrices.

More formally, given the expanded graph, G=(V,E), edge weights {w(i,j): i,j∈V,i≠j} and node weights {w(i):i∈V} as input, the original MCL algorithm is modified to reflect the node weights as part of the random walk. Two example ways of incorporating node weights to construct the transition probabilities of the random walk include (1) using the node weights as priors for starting the random walk, or (2) using the node weights to directly adjust the transition probabilities of the random walk. Another constraint that may be introduced for the transition probabilities are that we need to make sure that seed nodes are more stronger attractors in the random walk than other non-seed members. Thus, the transition probability from a non-seed node i∉Seeds to a seed node I∈I will be bigger than other transition probabilities. Finally, an arbitrary weight, I for self-loops will be used as $P_{raw}(i,j)$ if i=j to prevent periodic steady states in the random walk. Thus, the un-normalized raw transition probabilities of the random walk, $p(i,j)_{raw}$ (or $P_{raw}$, using the matrix notation), will be given as follows:

$$p(i, j)_{raw} = \begin{cases} \beta & \text{if } i = j \\ w(i, j) + \eta \cdot w(j) & \text{if } i \notin \text{Seeds}, j \in \text{Seeds}, \\ w(i, j) & \text{else} \end{cases}$$

where η is a parameter that determines the importance of node weights in the MCL algorithm.

Let P be the transition matrix that is obtained by normalizing $P_{raw}$. Following the original MCL algorithm, the random walk of MCL is started from a uniformly distributed initial state and two algebraic operations are alternated iteratively. The first algebraic operation is called expansion, which coincides with normal matrix multiplication of a random walk matrix. Expansion models the spreading out of flow, as it becomes more homogeneous. It multiples the current state by the matrix $P^2$, where the standard matrix multiplication is taken place. The second algebraic operation is called inflation, which is a Hadamard power followed by a diagonal scaling of another random walk matrix. Inflation models the contraction of a flow becoming thicker in regions of higher current and thinner in regions of lower current. It multiplies the current state by the matrix $P^r$, where r controls the inflation rate. Normalization may be made mandatory after each iteration, and the random walk is stopped when the matrix becomes steady.

Note that the MCL algorithm, by its design, generates a number of different clusters. By swapping the columns of the final steady matrix, different clusters could be obtained. The question remains, therefore, on which set of labels to choose in order to produce the final output. Since one goal is to produce a binary cut rather than a number of different clusters, the framework examines every generated cluster and selects a cluster with the biggest number of seed-labels as the left cut, while treating the union of all unselected clusters as the right cut. All label nodes in that biggest cluster, regardless of whether they are seed nodes or expanded nodes, are included in the final output of the binary cut and are produced as the set of labels associated with the given document. Note that different strategies of constructing the binary cut can be explored.

Normalized Graph Cut

In addition to the Max-Flow/Min-Cut and MCL, the normalized graph cut algorithm may be applied as a candidate cut algorithm to generate multi-label classification for an electronic document. Formally, given an input graph G=(V,E), the normalized graph cut algorithm seeks to partition the graph into k disjoint partitions or clusters $V_1 \ldots V_k$, such that their union is V. Let us denote link(A,B) to be the sum of the edge weights between nodes from two sets A and B. This can be expressed by equation (1) below.

$$\text{links}(A, B) = \sum_{i \in A, j \in B} w_{ij}, \quad (1)$$

where $w_{ij}$ is the edge weight between nodes i and j. In addition, let the degree of A be the links of nodes in A to all vertices, which is degree(A)=links(A, V). An approach may be used, which is to optimize the normalized cut criterion in generating the graph clusters. The normalized cut criterion measures both the total dissimilarity between the different groups, as well as the total similarity within the groups. Thus, it provides very cohesive clusters, with very high confidence that the nodes within the same cluster are very similar to each other. Formally, the normalized cut criterion is defined by equation (2) below.

$$NCut(G) = \min_{V_1, \ldots, V_k} \sum_{c=1}^{k} \frac{\text{links}(V_c, V \setminus V_c)}{\text{degree}(V_c)}, \quad (2)$$

After forming cohesive clusters, the next step is to identify the clusters that contain the topics that are applicable to the given article. To this end, we introduce a weight for each cluster $V_c$ as equation (3) below.

$$w(V_c) = \sum_{i \in V_c \,\&\&\, i \in Seeds} w_i \quad (3)$$

In other words, each cluster is given a weight equal to the sum of weights of seed nodes in that cluster. As previously described, each seed node has a weight generated from the weak learners, and this weight is a measure of the confidence that the topic of the node is applicable to the document. The weight in Equation (3) is normalized by the total sum of all the cluster weights. After the normalization, those clusters are selected that have a normalized weight greater than a threshold ThredN$_{Cut}$. The labels that correspond to nodes in these clusters are assigned to the document. The rationale here is that if a cluster has a high normalized weight, it has a good proportion of high confidence seed nodes. If many high confidence seed nodes are present in a cluster, the cluster is good candidate to be selected. However, if a cluster has only a few seed nodes or many low confidence seed nodes, the labels in that cluster have a low likelihood of being applicable to the document.

Some examples of deploying the framework for multi-label classification using three different cut algorithms are described below.

Experimental Dataset Description

For the purposes of an experimental deployment, 1200 labels were selected from the 50K label space. This set of labels was chosen such that it would be exhaustive enough to cover a very wide diversity of topics. More specifically, a data set consisting of 4000 documents (news articles) sampled from a news database of an on-line social network. These articles cover a diverse and broad range of topics. This document corpus was submitted to crowdsourcing to get the document set labeled by human judges. Crowdsourcing is a technique in which a job traditionally performed by an individual or a small team is completed by a virtual workforce. For each document, the candidate topics were identified by applying an ensemble of techniques including: (1) weak topic classifiers followed by label expansion, (2) high quality industry classifiers followed by expansion to corresponding topics using information stored in member profiles of an on-line professional networking system; and (3) labels selected based on the source of the document. On average, each document was tested against 100 labels.

Label Correlations

In the course of an experimental deployment, label correlation may be treated as an important factor to boost the result by expanding the original labels set. For each label assigned by the weak classifiers, the label correlation is leveraged to find out most related labels and the corresponding correlation scores. As mentioned above, the label correlations are computed information stored in member profiles of an on-line professional networking system that allows members to create and edit an organized resume. In the example on-line professional networking system, members can also explicitly list their professional skills by selecting from a set of standardized words and phrases (termed "skills" for the purposes of this description). These skills were used as labels for experimental deployment of the framework discussed herein. The advantage of deriving label correlation data from member profiles of an on-line professional networking system is that it may store millions of member profiles, which are carefully edited by individual members to reflect their professional expertise. Thus, label correlations may be derived with high confidence by mining the skills co-occurrence in the member profiles. It will be noted, that, in some embodiments, other approaches for deriving label correlations may be utilized. For instance, weak classifiers may be executed over an arbitrary set of documents and label correlations may be provided as an output of the executing of the weak classifiers.

To facilitate the cut algorithm, pairwise label correlations may be derived as symmetric Jaccard coefficient between the two skills. For skill $s_i$ and $s_j$; i≠j, we denote $P_i$, $P_j$ as the set of profiles where skills $s_i$ and $s_j$ are both listed, and Corr(i,j) as the correlation between $s_i$ and $s_j$. Then the correlation between $s_i$ and $s_j$ can be computed using equation (4) below.

$$\text{Corr}(s_i, s_j) = \frac{|P_i \cap P_j|}{|P_i \cup P_j|} \quad (4)$$

Implementation Detail and Running Time

The Max-Flow/Min-Cut algorithm may be implemented using the classical FordFulkerson approach with breadth first search. The weights between the nodes (excluding the source and sink) are naturally obtained from the label correlation values. The node weights on seed nodes are converted to edge weight to the source node Src. Also, every node, including the seed nodes and the expanded nodes are made connected to the sink node Snk. The parameters for the Max-Flow/Min-Cut approach may be chosen as $\eta=0.05$ and $\beta=0.07$.

For the Markov Clustering random walk approach, a Java implementation of the MCL algorithm may be used. The parameters for MCL include the inflation parameter r. By default, inflation parameter may be set as r=2. Another parameter is the loopGain weight, which is the edge weight placed on self-loops. Also, in this application of MCL the node weight is incorporated when building the transition matrix and making the seed nodes more "attractive." The effect of the node weight is controlled by the parameter $\eta$. In one embodiment, loopGain weight and $\eta$ are set as loopGain=0.2 and $\eta=1:0$.

For the normalized cut, Normalized Cut Clustering algorithm implemented by the Graclus library maybe executed. This algorithm takes, as input, the number of clusters that the graph should be partitioned into. However, in order to maintain very cohesive clusters, a large graph may need to be partitioned into more clusters than a smaller graph.

Figure 1:
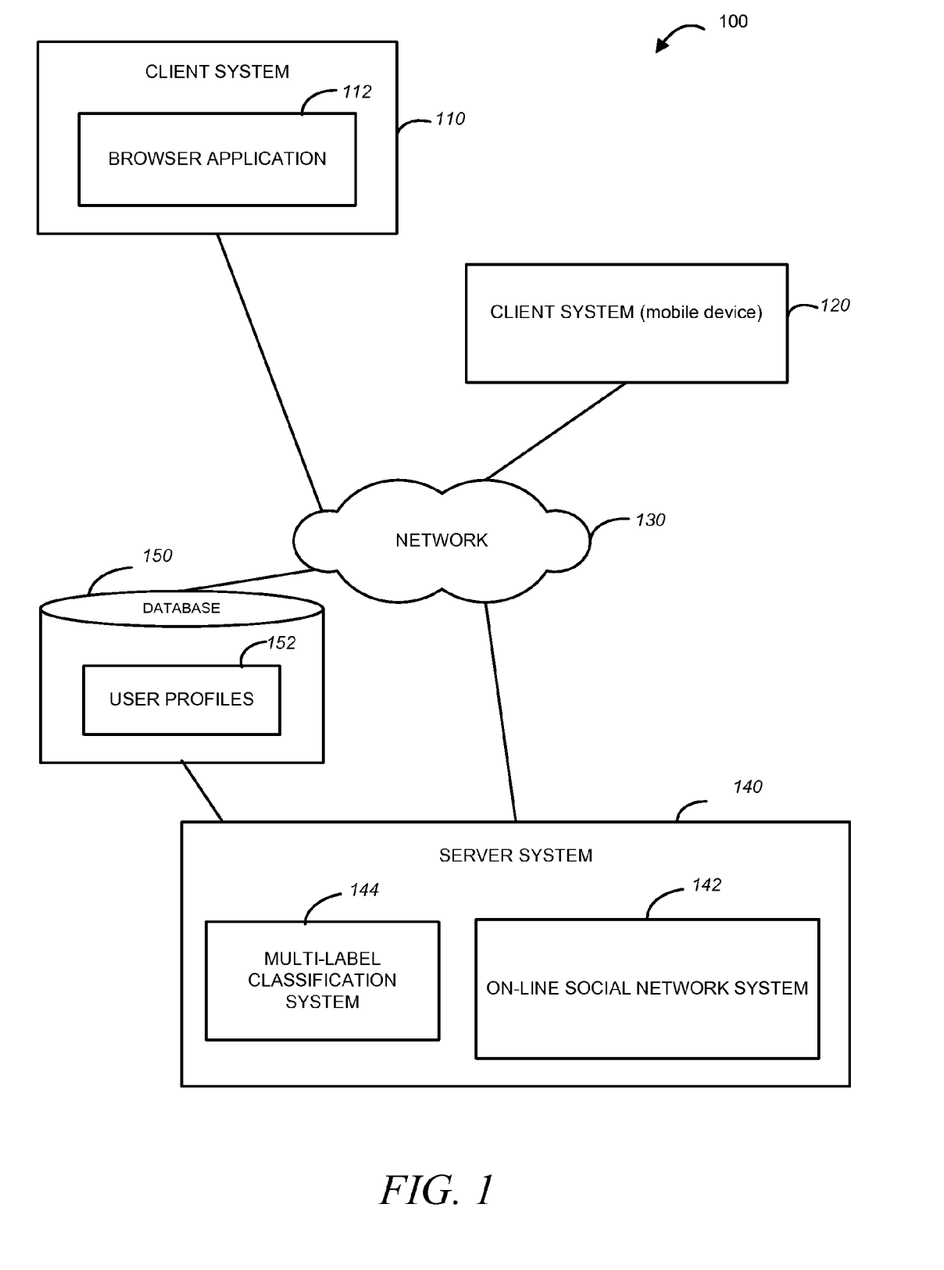
FIG. 1 is a diagrammatic representation of a network environment within which an example framework for large-scale multi-label classification may be implemented.

An example framework for large-scale multi-label classification may be implemented in the context of a network environment 100 illustrated in FIG. 1. As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as profiles 152.

The client systems 110 and 120 may be permitted to access the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a multi-label classification system 144. In one example embodiment, the multi-label classification system 144 is configured to determine the topics discussed or referenced in an electronic document. The multi-label classification system 144 may be configured to first apply weak classifiers and identify seed labels, then determine additional labels based on the seed labels and derived from member profiles maintained by the on-line social network system 142, and then construct an s-t graph comprising nodes that correspond to the seed labels and the additional labels. The multi-label classification system 144 may then apply a classification algorithm to the constructed graph to arrive to a so-called labels graph. The labels graph is deemed to include nodes that correspond to topics discussed or referenced in the subject electronic document. In one embodiment, the multi-label classification system 144 utilizes weak classifiers, graph construction and expansion approaches, and clustering algorithms described above. An example multi-label classification system is illustrated in FIG. 2.

Figure 2:
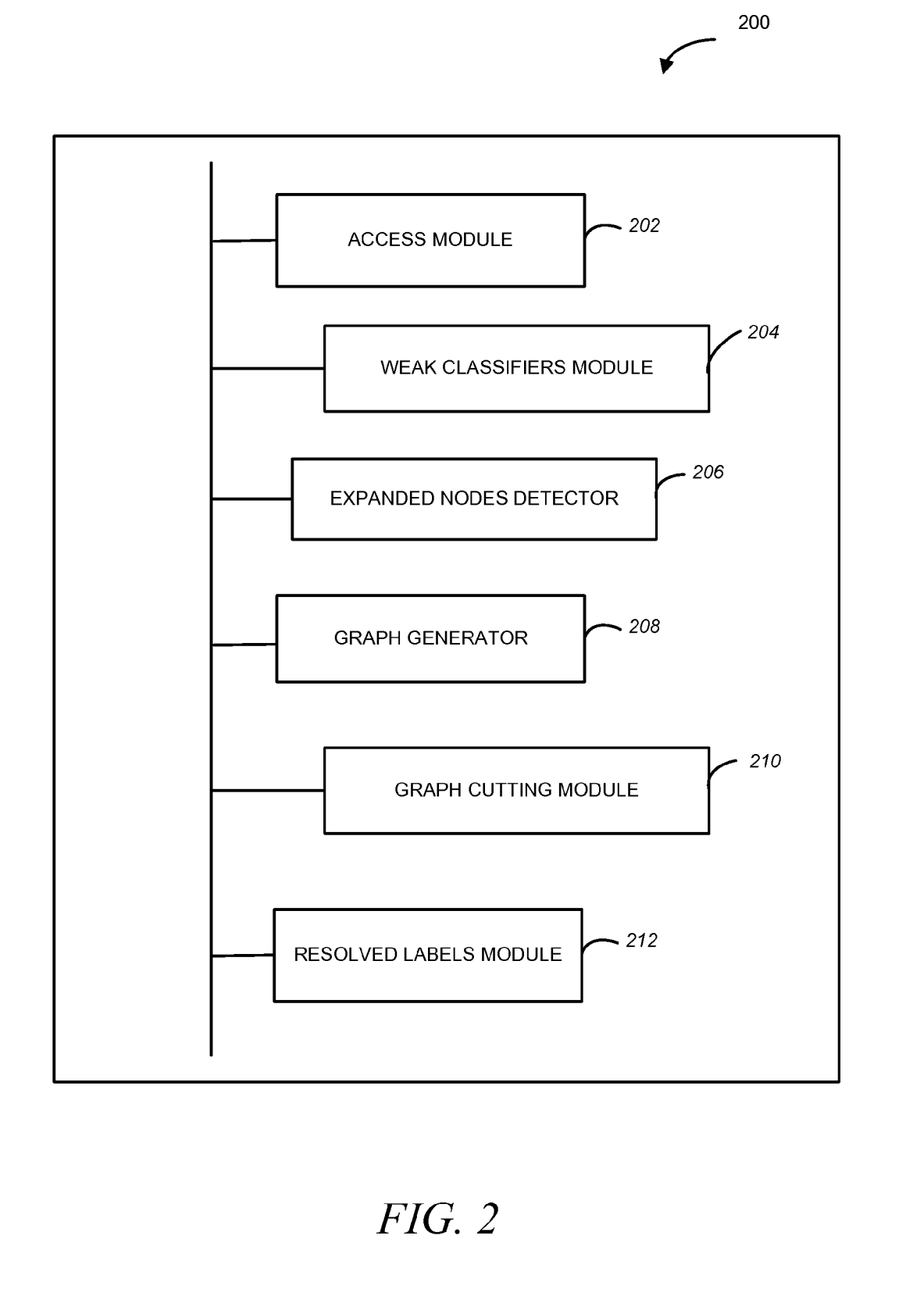
FIG. 2 is block diagram of a system to provide a framework for large-scale multi-label classification, in accordance with one example embodiment.

FIG. 2 is a block diagram of a system 200 to provide a framework for large-scale multi-label classification, in accordance with one example embodiment. The system 200, for the purposes of this description, may be referred as the "framework." As shown in FIG. 2, the system 200 includes an access module 202, a weak classifiers module 204, an expanded nodes detector 206, a graph generator 208, a graph cutting module 210, and a resolved labels module 212. The access module 202 may be configured to access an electronic document that is the subject of classification or categorization. The weak classifiers module 204 may be configured to apply one or more weak classifiers to the contents of the electronic document in order to identify one or more seed labels. The seed labels represent preliminary content topics associated with the electronic document. As explained above, example weak classifiers include a conditional random field based tagger (termed CRF-Tagger) and a maximum-entropy-based text classifier (MaxEnt Classifier). The expanded nodes detector 206 may be configured to derive one or more additional labels based on co-occurrence of labels in member profiles of an on-line social networking system, utilizing the one or more seed labels. The graph generator 208 may be configured to generate an expanded graph comprising nodes and edges, the nodes representing the one or more additional labels and the one or more seed labels, and the edges in the expanded graph having respective edge weights. The edge weights may be constructed using values that reflect correlation between labels represented by nodes connected to the edge.

In one example embodiment, the framework leverages co-occurrence of skills in the member profiles of an on-line social networking system to derive correlation values (also referred to as label correlation values) associated with pairs of skills in the associated skills dictionary. The label correlation values may be represented as directed and un-directed edge. As mentioned above, Jaccard Similarity algorithm may be used to calculate label correlation values.

Consider two skills, A and B. Let's denote the number of occurrences of skill A as |A| and the number of occurrences of skill B as |B|. The number of co-occurrence (both A and B occurring in the same member profile) as |A and B|, and the number of occurrences either A or B or both—as |A or B|. An un-directed edge weight is calculated as |A and B|/|A or B|. A directed edge weight from A to B is calculated as |A and B|/|A|. A directed edge weight from B to A is calculated as |A and B|/|B|. This approach, using directed edge weights, makes it easier to expand from "smaller" topics to "larger" ones, rather than the from the "larger" ones to the "smaller" ones. The notion of "larger" and "smaller" topics may be illustrated as follows. For example, if A="java programming" and B is "software engineering," the topic of java-programming is definitely related to software-engineering but the other way is not guaranteed. The topic of java-programming is considered as larger than the topic of software-engineering.

The procedure of graph expansion utilizing node weights and edge weights can be described as follows. Each seed node identified by the weak classifiers has an associated score produced by the weak classifiers. These scores may be utilized as node weights. The expanded graph generated by the graph generator 208 may also include label correlation scores as edge weights. In one embodiment, the expanded graph is an S-T (source-to-sink) graph that incorporates both the edge weights and node weights. The edge weights and node weights are aggregated as the ultimate edge capacities in the S-T graph. A parameter balancing the importance of edge weights and node weights may be utilized to translate the node weights of the seed nodes into the flow capacities of the edges between the seed nodes and the source node. The label correlation values are used as edge weights of the edges connecting the seed nodes and the expanded nodes, as well as edge weights between the seed nodes or between the expanded nodes. The expanded, as well as the seed nodes, are all connected to the sink, with carefully chosen parameters controlling the edge capacities. Thus, in the expanded graph generated by the graph generator 208, the seed nodes and the expanded nodes are connected with associated capacities, such that both categories of nodes may or may not survive the cut algorithm, depending on how they are connected to each other. In one embodiment, an expanded graph is stored by the associated on-line social networking system. In one embodiment, the graph generator 208 may be configured to generate an expanded graph in an ad-hoc fashion. As new correlations or new skills are identified within the associated on-line social networking system, the existing correlations and the respective edge weights of the expanded graph may be updated.

Returning to FIG. 2, the graph cutting module 210 may be configured to apply a clustering algorithm to the expanded graph generated by the graph generator 208 to produce a so called labels graph. The resolved labels module 212 may be configured to identify nodes of the labels graph as a set of resolved content topics associated with the electronic document. As discussed above, example clustering algorithms include a minimum cut and maximum flow algorithm, Markov clustering, and the normalized graph cut algorithm.

Example operations performed by the system 200 may be described with reference to FIG. 3.

Figure 3:
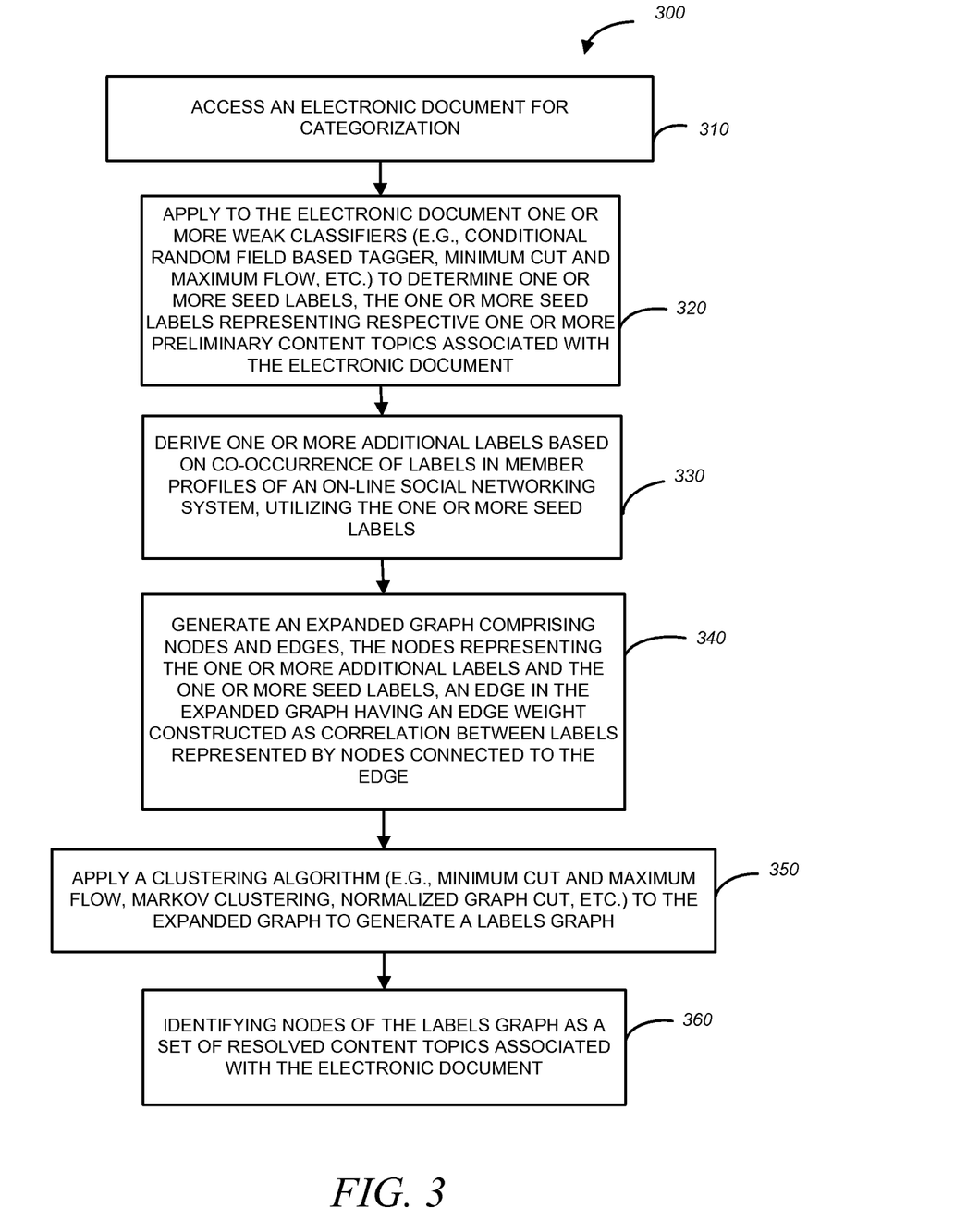
FIG. 3 is a flow chart of a method for utilizing a framework for large-scale multi-label classification, in accordance with an example embodiment.

FIG. 3 is a flow chart of a method 300 for utilizing a framework for large-scale multi-label classification, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the access module 202 of FIG. 2 accesses an electronic document that is the subject of classification or categorization. At operation 320, the weak classifiers module 204 of FIG. 2 applies one or more weak classifiers to the contents of the subject electronic document in order to identify one or more seed labels. The seed labels represent preliminary content topics associated with the electronic document. Example weak classifiers include a conditional random field based tagger (termed CRF-Tagger) and a maximum-entropy-based text classifier (MaxEnt Classifier). The expanded nodes detector 206 of FIG. 2 derives one or more additional labels at operation 330. As explained above, additional labels may be derived utilizing the one or more seed labels, based on co-occurrence of labels in member profiles of an on-line social networking system. Correlations values may be generated using Jaccard Similarity algorithm. At operation 340, the graph generator 208 of FIG. 2 generates an expanded graph. The nodes of the expanded graph represent the additional labels and the seed labels. The edges of the expanded graph have respective edge weights that may be calculated as described above.

At operation 350, the graph cutting module 210 of FIG. 2 applies a clustering algorithm to the expanded graph to produce a so called labels graph. As discussed above, example clustering algorithms include a minimum cut and maximum flow algorithm, Markov clustering, and the normalized graph cut algorithm. The resolved labels module 212 of FIG. 2 identifies nodes of the labels graph as a set of resolved content topics associated with the electronic document at operation 360.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
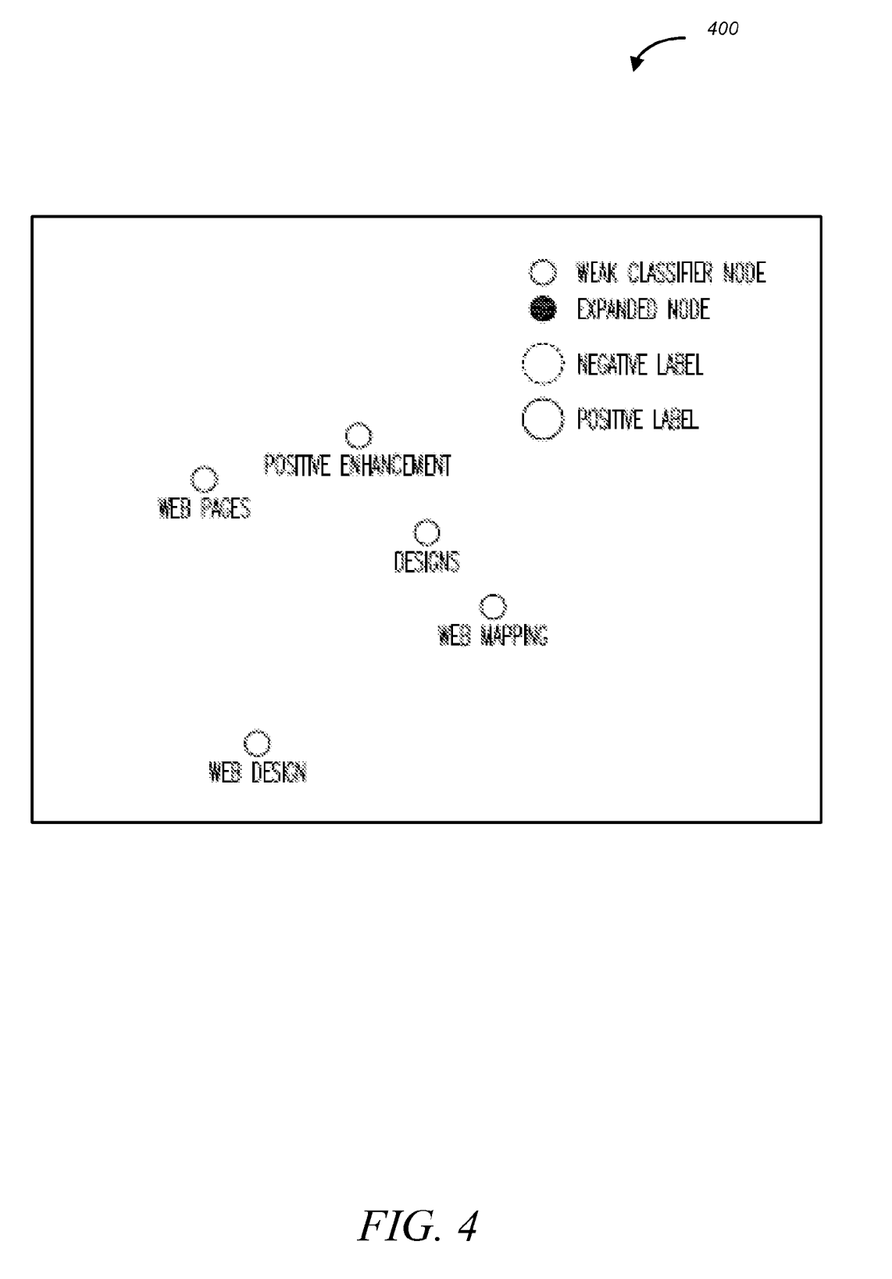
FIG. 4 is a diagrammatic representation of nodes discovered based on the output of one or more weak classifiers.
Figure 5:
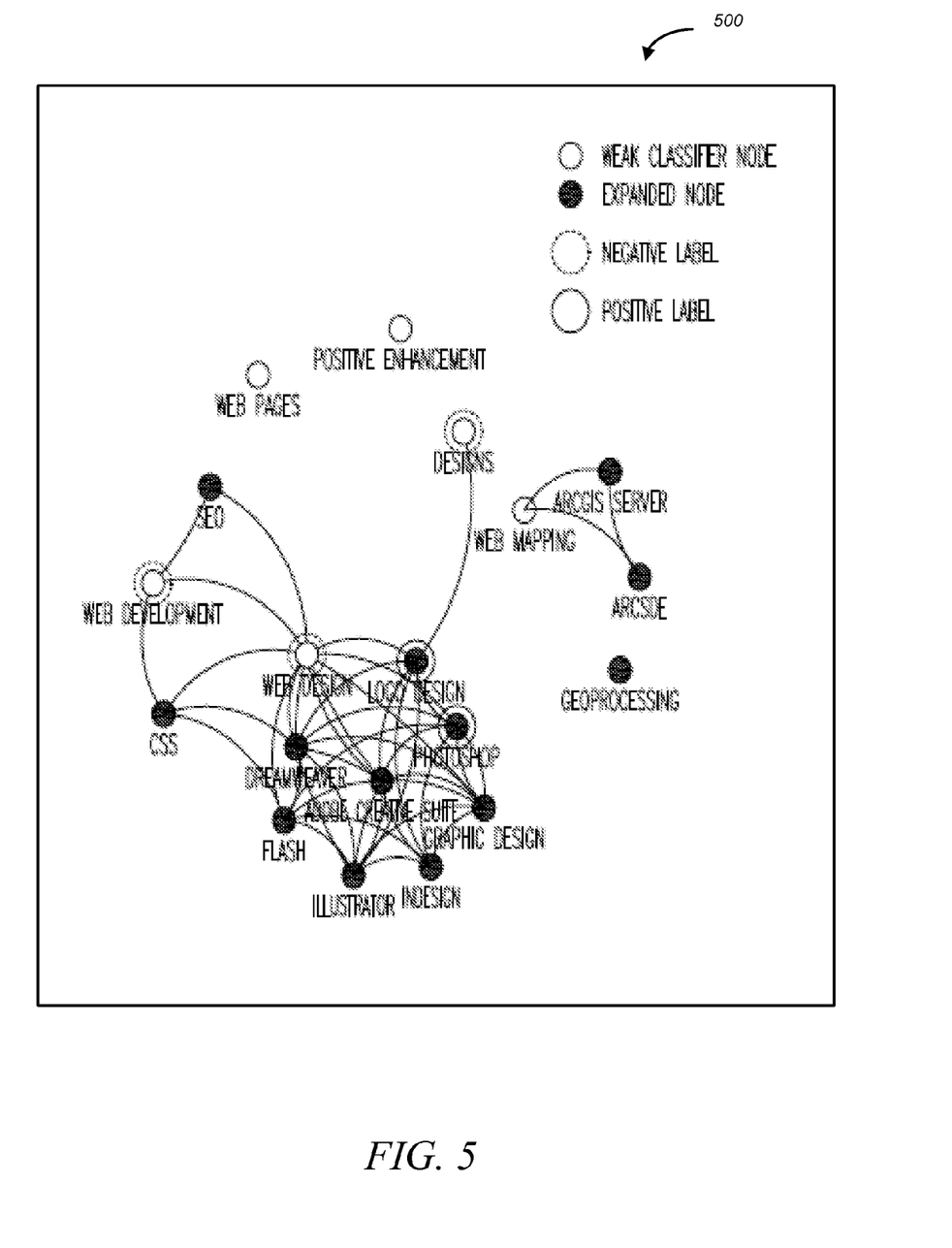
FIG. 5 is a diagrammatic representation of an example expanded graph.
Figure 6:
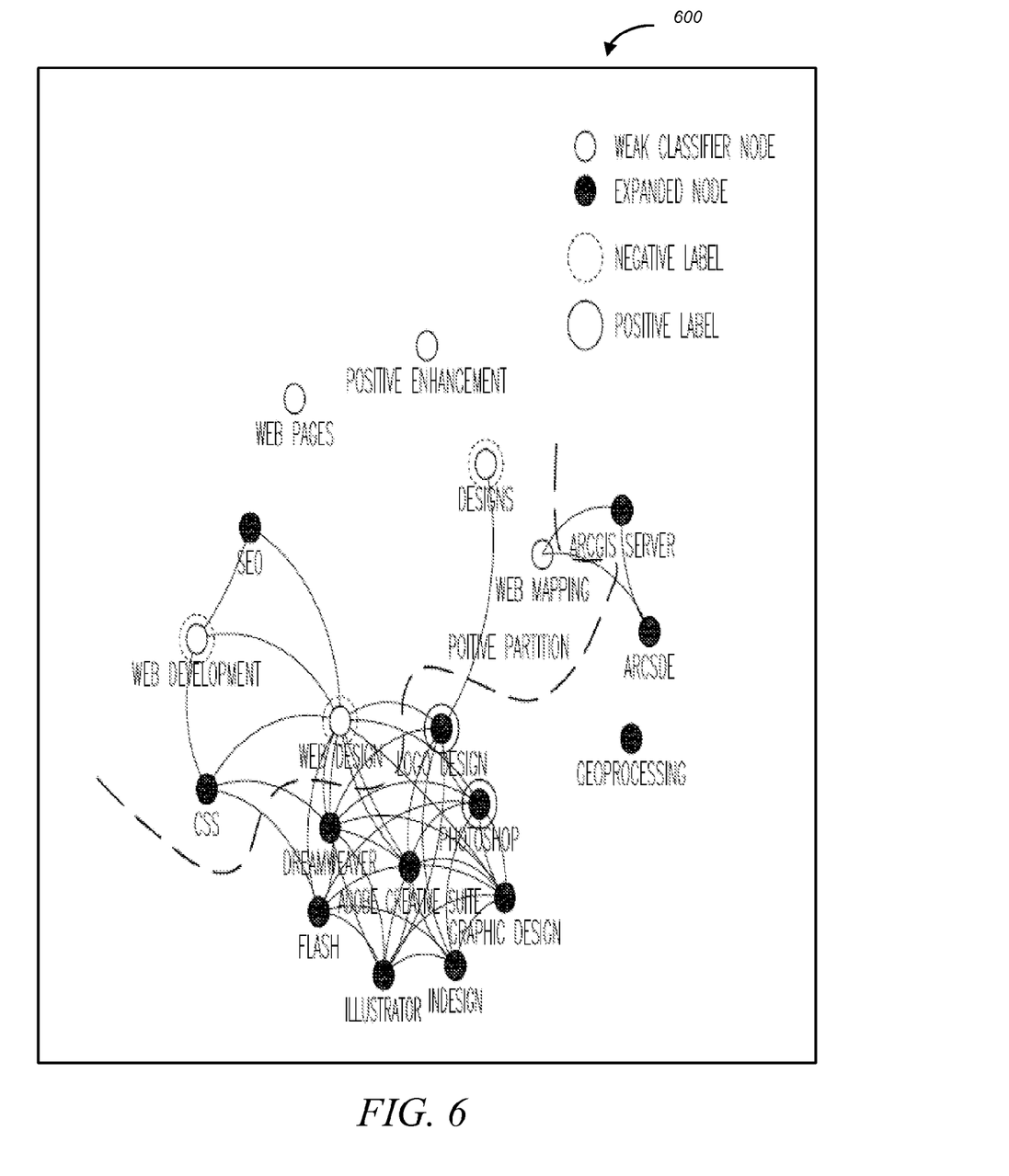
FIG. 6 is a diagrammatic representation of an example cut graph resulting from an application of a binary cut.

FIG. 4-6 illustrate example results of the weak classification, graph construction and expansion operations, and example results of a binary cut applied to the expanded graph. FIG. 4 shows a diagram 400 that includes seed labels (represented as nodes) discovered by applying weak classifiers to the contents of an electronic document. The seed labels are "Progressive Enhancement," "Web Pages," "Designs," "Web mapping," and "Web Design." FIG. 5 shows a diagram 500 illustrating an expanded graph produced by utilizing correlation information based on co-occurrence of words and phrases describing professional skills listed in member profiles of an on-line social networking system. As shown in FIG. 5, in addition to the seed labels, the nodes of the expanded graph include labels, such as "CSS," "Logic Design," and "Web Mapping." FIG. 6 shows a diagram 600 illustrating a labels graph produced by applying a binary cut to the expanded graph shown in FIG. 5. The nodes that appear above the broken line, termed "positive partition," are identified as representing nodes resolved content topics associated with the electronic document.

Figure 7:
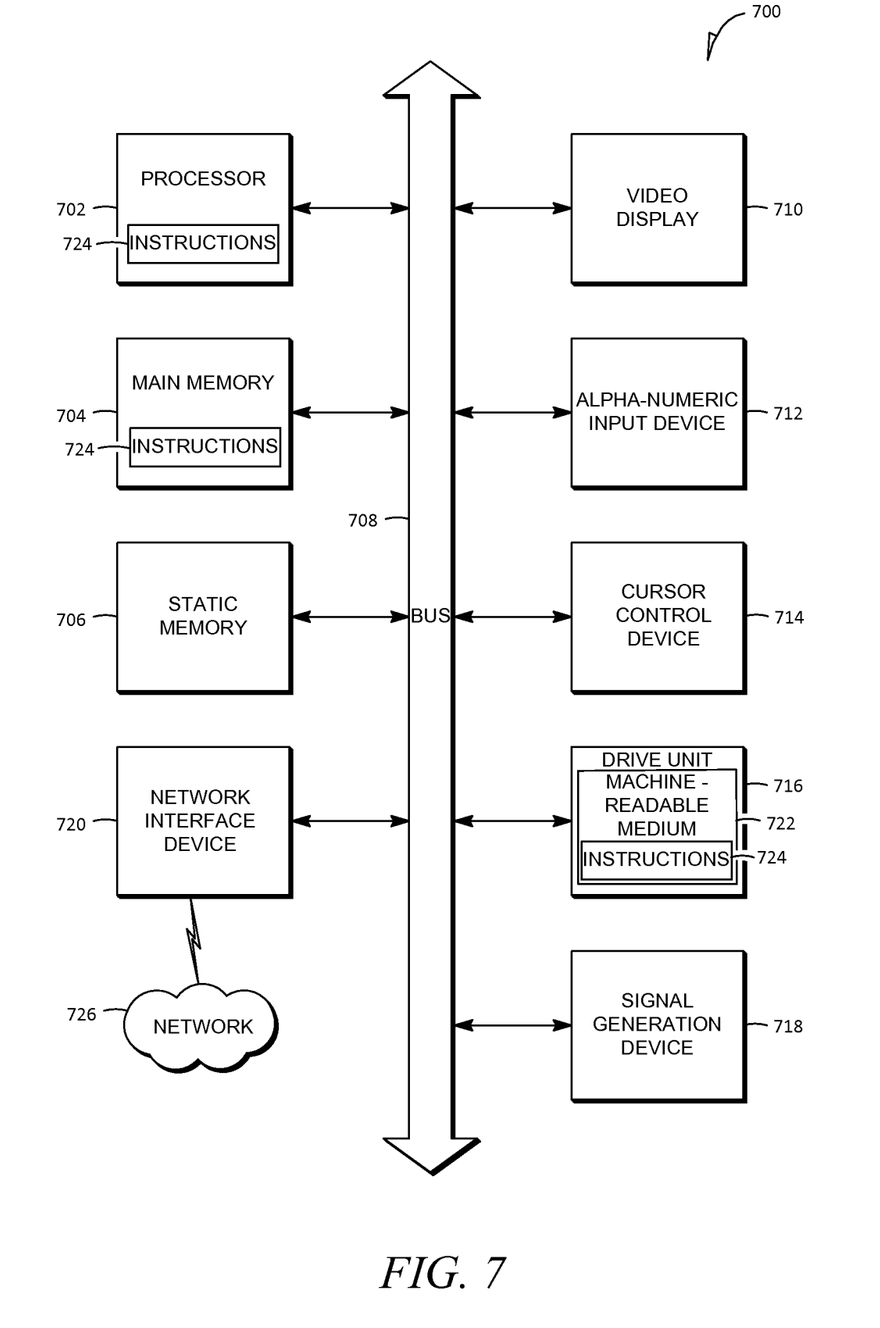
FIG. 7 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, the framework for large-scale multi-label classification has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
applying, one or more weak classifiers to contents of an electronic document to identify one or more seed labels, the one or more seed labels representing respective one or more preliminary content topics associated with the electronic document;
generating a seed graph, nodes of the seed graph representing the one or more seed labels;
based on co-occurrence of labels in member profiles of an on-line social networking system, deriving one or more additional labels, utilizing the one or more seed labels;
generating, using at least one processor, augmenting the seed graph utilizing the one or more additional labels to generate an expanded graph comprising nodes and edges, the nodes representing the one or more additional labels and the one or more seed labels, each node from the expanded graph that represents an additional node from the one or more additional labels does not also represent a seed label from the one or more seed labels, an edge in the expanded graph having an edge weight constructed as correlation between labels represented by nodes connected to the edge;
applying a clustering algorithm to the expanded graph to generate a labels graph; and
identifying nodes of the labels graph, as a set of resolved content topics associated with the electronic document.

2. The method of claim 1, wherein the edge weight is a directed edge weight.

3. The method of claim 1, wherein the edge weight is an undirected edge weight.

4. The method of claim 1, wherein the generating of the expanded graph comprises assigning respective weights to nodes of the expanded graph.

5. The method of claim 1, wherein the labels in the member profiles of the on-line social networking system correspond to entries in a dictionary of skills maintained by the on-line networking system, the entries comprising respective words and phrases describing professional skills of respective members of the on-line social networking system.

6. The method of claim 1, wherein the one or more weak classifiers comprises a conditional random field based tagger (CRF CFR Tagger).

7. The method of claim 1, wherein the one or more weak classifiers comprises a maximum entropy based text classifier.

8. The method of claim 1, wherein the clustering algorithm is based on a minimum cut and maximum flow algorithm.

9. The method of claim 1, wherein the clustering algorithm is Markov clustering algorithm.

10. The method of claim 1, wherein the clustering algorithm is normalized graph cut algorithm.

11. A machine-readable non-transitory storage medium having instruction data to cause a machine to:
apply one or more weak classifiers to contents of an electronic document to identify one or more seed labels, the one or more seed labels representing respective one or more preliminary content topics associated with the electronic document;
generate a seed graph, nodes of the seed graph representing the one or more seed labels;
derive one or more additional labels based on co-occurrence of labels in member profiles of an on-line social networking system, utilizing the one or more seed labels;
generate augment the seed graph utilizing the one or more additional labels to generate an expanded graph comprising nodes and edges, the nodes representing the one or more additional labels and the one or more seed labels, each node from the expanded graph that represents an additional node from the one or more additional labels does not also represent a seed label from the one or more seed labels, an edge in the expanded graph having an edge weight constructed as correlation between labels represented by nodes connected to the edge;
apply a clustering algorithm to the expanded graph to generate a labels graph; and
identify nodes of the labels graph as a set of resolved content topics associated with the electronic document.

12. The machine-readable non-transitory storage medium of claim 11, wherein the edge weight is a directed edge weight.

13. The machine-readable non-transitory storage medium of claim 11, wherein the edge weight is an undirected edge weight.

14. The machine-readable non-transitory storage medium of claim 11, wherein the generating of the expanded graph comprises assigning respective weights to nodes of the expanded graph.

15. The machine-readable non-transitory storage medium of claim 11, wherein the labels in the member profiles of the on-line social networking system correspond to entries in a dictionary of skills maintained by the on-line networking system, the entries comprising respective words and phrases describing professional skills of respective members of the on-line social networking system.

16. The machine-readable non-transitory storage medium of claim 11, wherein the one or more weak classifiers comprises a conditional random field based tagger (CRF Tagger).

17. The machine-readable non-transitory storage medium of claim 11, wherein the one or more weak classifiers comprises a maximum entropy based text classifier.

18. The machine-readable non-transitory storage medium of claim 11, wherein the clustering algorithm is based on a minimum cut and maximum flow algorithm.

19. The machine-readable non-transitory storage medium of claim 11, wherein the clustering algorithm is Markov clustering algorithm.

* * * * *

UNITED STATES PATENT AND TRADEMARK OFFICE
CERTIFICATE OF CORRECTION

PATENT NO. : 8,805,845 B1
APPLICATION NO. : 13/956070
DATED : August 12, 2014
INVENTOR(S) : Li et al.

It is certified that error appears in the above-identified patent and that said Letters Patent is hereby corrected as shown below:

On the title page, item (73), in "Assignee", in column 1, line 1, delete "LinedIn" and insert --LinkedIn--, therefor On title page 2, in column 1, under "Other Publications", line 1-2, delete "classifcation" and insert --classification--, therefor On title page 2, in column 1, under "Other Publications", line 32, delete "Multilabel" and insert --Multi-label--, therefor In the Claims In column 15, line 65, in Claim 6, after "CRF", delete "CFR", therefor Signed and Sealed this
Eleventh Day of November, 2014

Michelle K. Lee
*Deputy Director of the United States Patent and Trademark Office*